United States Patent [19]

Smith

[11] Patent Number: 4,541,081

[45] Date of Patent: Sep. 10, 1985

[54] ELECTROACOUSTIC TRANSDUCER

[75] Inventor: John R. E. Smith, Houston, Tex.

[73] Assignee: Dresser Industries, Inc., Dallas, Tex.

[21] Appl. No.: 352,271

[22] Filed: Feb. 25, 1982

[51] Int. Cl.³ .................... G01V 1/40; G01V 1/16
[52] U.S. Cl. ................... 367/168; 367/156; 367/912; 310/26
[58] Field of Search ............ 367/912, 168, 156, 159, 367/185; 310/26; 181/106; 29/602 A; 73/668

[56] References Cited

U.S. PATENT DOCUMENTS

| | | | |
|---|---|---|---|
| 3,496,533 | 2/1970 | Semmelink | 367/912 |
| 3,614,725 | 10/1971 | Moran | 367/86 |
| 4,219,095 | 8/1980 | Trouiller | 181/104 |
| 4,220,887 | 9/1980 | Kompanek | 310/334 |
| 4,228,532 | 10/1980 | Sims | 367/159 |
| 4,296,486 | 10/1981 | Vasile | 310/26 |

Primary Examiner—Nelson Moskowitz
Assistant Examiner—Ian J. Lobo
Attorney, Agent, or Firm—Patrick H. McCollum; Richard M. Byron

[57] ABSTRACT

An improved transducer for generating and receiving acoustic energy. A transducer core is constructed by bonding together a plurality of concentric cylinders to provide a ferromagnetic core. A magnetic vector is established circumferentially about the core by passing a current through an electrical winding, wound torridially about the core. A pulsed current source connected across the core provides a high-magnitude, short-duration pulse output establishing current flow from one end to the other end of all of the concentric cylinders. Current flow within the magnetic field causes a force vector and magnetic vector creating a pressure wave.

7 Claims, 3 Drawing Figures

ELECTROACOUSTIC TRANSDUCER

BACKGROUND OF THE INVENTION

This invention relates generally to acoustic well logging of formations surrounding a borehole, and more particularly to methods and apparatus for generating and receiving high energy acoustic signals.

It is common in the oil and gas industry to traverse a borehole with an acoustic logging instrument for obtaining selected measurements relating to the producibility of any oil or gas which may be present in the formations surrounding the borehole. As the acoustic logging instrument traverses a borehole high energy acoustic signals are generated by an acoustic transducer functioning as a transmitter. These high energy acoustic signals travel through a portion of the surrounding earth formations and are detected by an acoustic transducer functioning as a receiver located a longitudinally spaced distance from the transmitter. One common measurement derived by the acoustic logging instrument is the acoustic energy travel time from the location of acoustic energy generation to the location of receipt by the receiver. This interval travel time is the reciprocal of the acoustic energy velocity through the interval. Such a measurement can provide formation information related to porosity, fracturing and lithology.

One form of acoustic transducer often used in well logging applications is the magnetostrictive transducer. The magnetostrictive acoustic transducer typically is constructed of a thin layer of ferromagnetic material wrapped about itself to form a hollow cylinder. A large number of turns of wire are wound toroidally about the cylinder. A high-amplitude pulse of relatively short duration is applied to the winding causing the establishment of a magnetic field. The presence of the magnetic field causes a mechanical deformation of the ferromagnetic core resulting in energy being emitted from the transducer. The magnetostrictive transducer, although durable, is limited in energy output due to saturation of the ferromagnetic core. Additionally, due to the relatively high impedance of the winding it is difficult to produce the relatively short output pulse required for acoustic logging.

Yet another form of acoustic energy transducer used in acoustic well logging applications is the piezoelectric transducer. The piezoelectric transducer is constructed of a ceramic cylinder to which a short-time duration, high-amplitude pulse is applied to produce an output. The change in the applied signal results in a change on the stress of the ceramic material thereby causing an impulse of energy to be emitted by the transducer. For applications in acoustic well logging, the piezoelectric transducer is extremely fragile. Additionally, the ceramic cylinder has a relatively low limit of internal stress which results in shattering if the pulse applied thereto is too large in amplitude.

These and other disadvantages are overcome with the present invention by providing a method and an apparatus for generating and receiving acoustic energy which consists of a plurality of bonded concentric cylinders of ferromagnetic material through which a pulse of current is passed and a torrodial winding about the cylinders coupled to a magnetization source.

SUMMARY OF THE INVENTION

Apparatus for acoustic well logging includes a plurality of acoustic transducers for generating and receiving acoustic energy. The acoustic transducers are comprised of a cylindrical core constructed of a plurality of concentric cylinders of ferromagnetic material bonded together and electrically insulated from each adjacent cylinder. A wire coil is wound toroidally about the cylinder and is coupled to a source of constant voltage. A pulsed current source is coupled between the ends of each and every concentric cylinders.

The constant voltage source causes current to flow within the coil windings establishing a magnetic vector circumferentially about the cylinder. The application of a short-time duration, high-magnitude current pulse across the plurality of cylinders causes a current vector along the cylinders. The flow of current within the magnetic field causes a force vector at a right angle to both the current vector and the magnetic vector creating a high energy output from the transducer.

DETAILED DESCRIPTION OF THE PREFERRED EMBODIMENT

Figure 1:
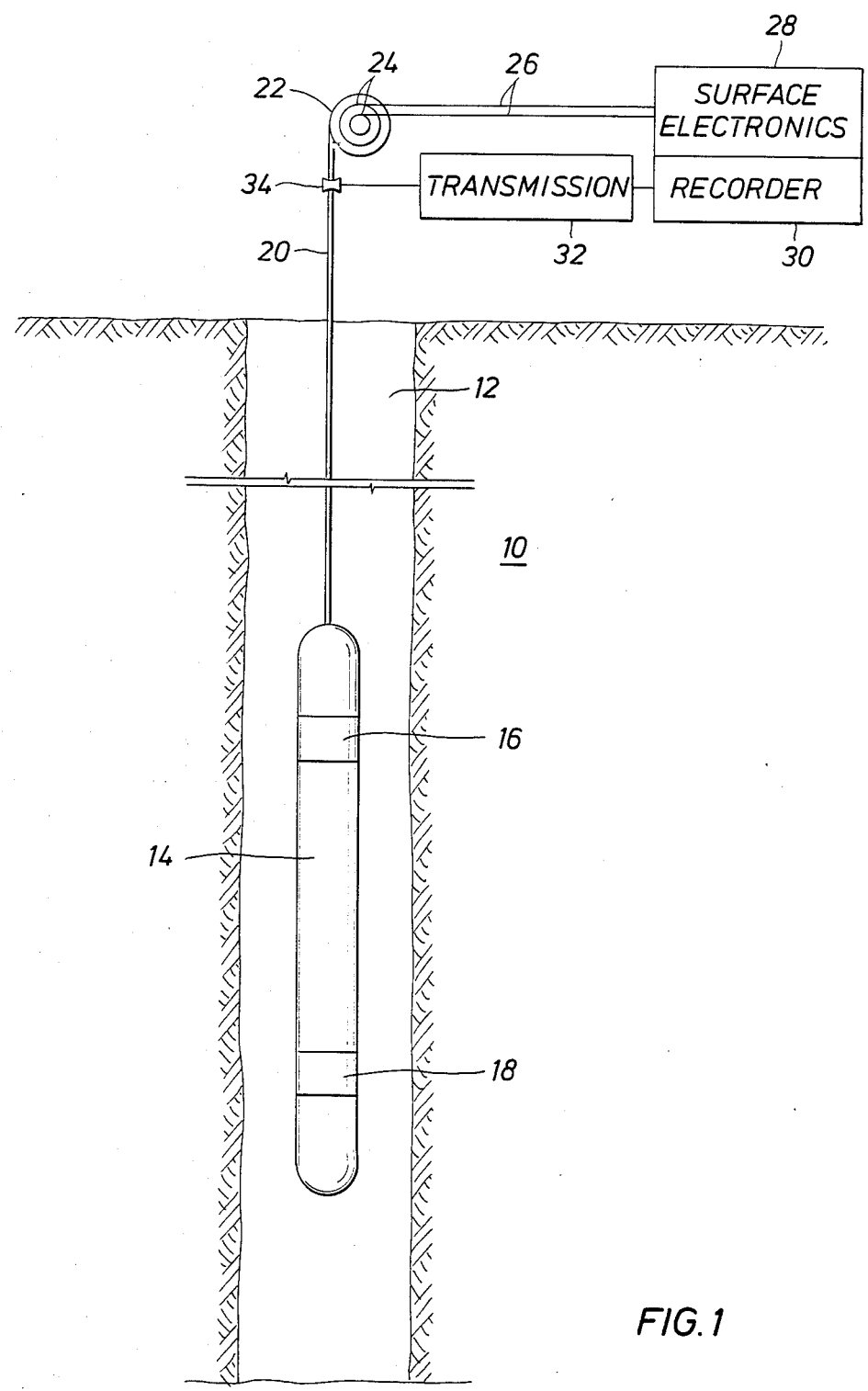
FIG. 1 is a pictorial view, partly in crossection, of an acoustic well logging operation.

Referring now to the drawings in detail, particularly to FIG. 1, there is illustrated schematically an acoustic well surveying operation in which a portion of the earth formations 10 is shown in vertical section. Well 12 penetrates the earth's surface and may or may not be cased. Disposed within well 12 is subsurface acoustic instrument 14 of the well logging system. Subsurface instrument 14 comprises an acoustic energy transmitting transducer 16 and an acoustic energy receiving transducer 18. Cable 20 suspends instrument 14 in well 12 and contains the required conductors for electrically connecting instrument 14 with the surface apparatus. Cable 20 is wound on or unwound from drum 22 in raising and lowering instrument 14 to traverse well 12.

In making an acoustic well survey, instrument 14 is caused to traverse well 12. Thereby, acoustic energy from transmitting transducer 16 irradiates the formation. The acoustic energy radiates outwardly from transmitter 16 and travels through the earth formations at a velocity characteristic of the formations. After having traveled a predetermined distance through the formations, the acoustic energy is detected by receiving transducer 18. The basic measurement of an acoustic surveying operation is the interval travel time from transmitter 16 to receiver 18, which is the reciprocal of the internal velocity of the acoustic energy. The resultant signals are transmitted to the surface through cable 20. Through slip rings 24 on the end of drum 22, the signals are connected by means of conductors 26 to surface electronics 28, where such signals are processed and recorded on recorder 30. Recorder 30 is driven through transmission 32 by measuring reel 34 over which cable 20 is drawn so that recorder 30 moves in correlation with depth as instrument 14 traverses well 12. The elements are shown diagrammatically, and it is to be understood that the associated electronic circuits and power supplies are provided in a conventional manner. It is also to be understood that the instrument housing will be constructed to withstand the pressures and mechanical and thermal abuses encountered in surveying a deep well and to provide adequate space within it to house the necessary apparatus.

Figure 2:
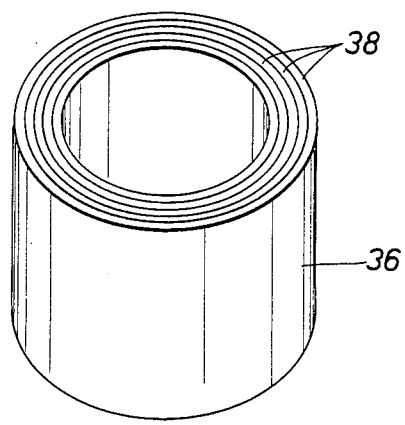
FIG. 2 is a perspective view of a cylindrical transducer core constituting the present invention.
Figure 3:
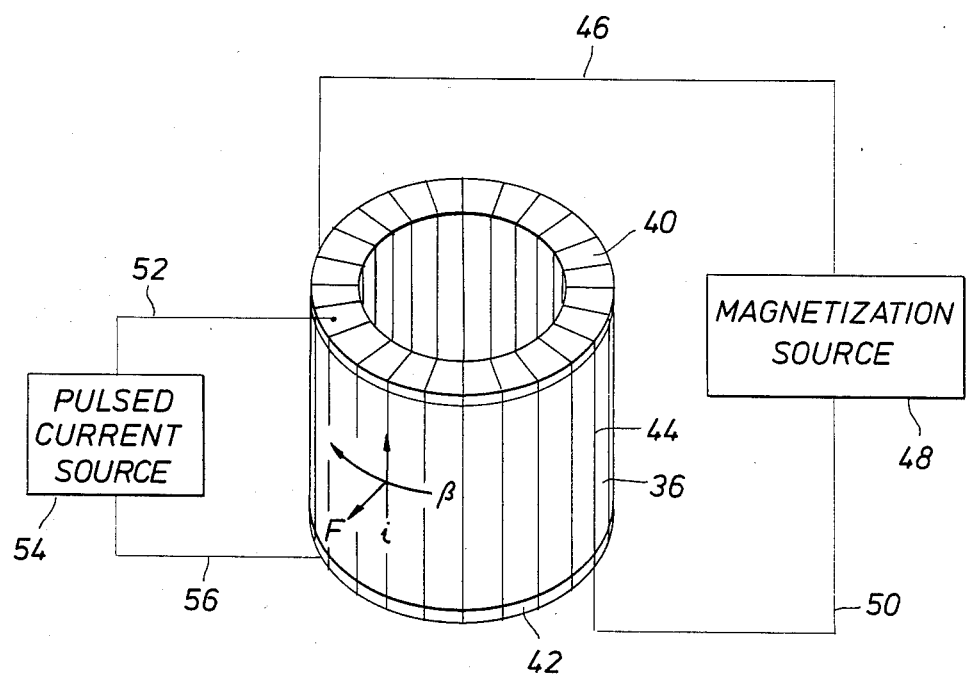
FIG. 3 is a perspective view in assembled view of an electromechanical transducer constituting the present invention.

Referring now to FIGS. 2 and 3, there is illustrated a preferred embodiment of the acoustic transducer of the present invention. The acoustic transducer includes a cylindrical core 36 constructed of a plurality of concentric cylinders, illustrated at 38, closely-fitted one within another and bonded together by a suitable non-conductive bonding material. Cylinders 38 are constructed of thin layers of ferromagnetic material and are electrically insulated from the adjacent cylinders. End caps 40 and 42 are installed at the ends of core 36 and are placed into electrical contact, by soldering or other suitable methods, with the ends of each of the series of ferromagnetic cylinders 38.

An electrical winding 44 is wound in torridal fashion about cylindrical core 36 and the attached end caps 40 and 42. A first end of electrical winding 44 is connected by electrical conductor 46 to magnetization source 48. Likewise, the second end of electrical winding 44 is connected by electrical conductor 50 to magnetization source 48. In the preferred embodiment magnetization source 48 is comprised of a d.c. power source. End cap 40 is connected by electrical conductor 52 to one side of pulsed current cource 54 with end cap 42 connected by electrical conductor 56 to the other side of pulsed current source 54. Pulsed current source 54 is of a conventional type designed to provide a relatively short-time duration, relatively high-magnitude output.

In the operation of the acoustic transducer of FIG. 3, magnetization source 48 causes current to flow within electrical winding 44 thereby establishing a magnetic induction field having a magnetic vector $\beta$. A high-magnitude transition output from pulsed current source 54 will establish current flow from end cap 42 through each of the ferromagnetic cylinders 38 to end cap 40, establishing current vector i. When pulsed current source 54 establishes current flow within cylinders 38 within the established magnetic field a resultant mechanical force, force vector F, will be exerted at right angles to both magnetic vector $\beta$ and current vector i. The force exertion F causes a change in the mechanical dimensions of core 36 further causing a high energy pressure wave to be generated. The relationship of the magnetic vector, the current vector and the force vector is as follows:

$$F = i \times \beta \tag{1}$$

As shown by equation (1) the force is dependent upon the product of the magnetic field $\beta$ and the current field i.

It should be understood that the magnetic vector $\beta$ exists throughout the complete core 36 and that the current vector i is representative of numerous sheets of current flow patterns in each an every concentric laminate of core 36 and that there is a multiplicity of force vectors radiating outwardly from the face of each of the concentric cylinders 38. The resultant force tends to expand the entire ferromagnetic core 36. Since the magnetic vector B is developed by a d.c. source, toroidal winding 44 may consist of a many turns as physically possible without the resulting inductive component of the winding limiting the magnetication current flow. Further, since core 36 is constructed of a metallic material, greater internal stresses may be developed without damaging the transducer.

The acoustic transducer also finds utility as a receiving transducer. To function as a receiver the magnetic field is maintained constant. Energy impinging winding 44 will establish a current output functionally related to the magnitude of the energy field impinging the winding. The current flow is measured by a suitable electronic circuit to provide an indication of the magnitude of the received energy.

Many modifications and variations besides those specifically mentioned may be made in the techniques and structures described herein and depicted in the accompanying drawing without departing substantially from concept of the present invention. For example, instead of constructing the core from a number of concentric cylinders, the core could be constructed by continuously winding a metallic strip about itself. Accordingly, it should be understood that the forms of the invention described and illustrated herein are exemplary only, and are not intended as limitations on the scope of the present invention.

The embodiments of the invention in which an exclusive property or privilege is claimed are defined as follows:

1. An electroacoustic transducer for use in acoustic well logging, comprising:
    a plurality of cylindrical members coaxially disposed and electrically insulated along the cylinder areas thereof;
    a pair of end caps electrically connected to the axial ends of said plurality of cylindrical members;
    an electrical winding wound toroidially about said plurality of cylindrical members;
    a d.c. source for establishing a current flow within said winding thereby establishing a circumferential magnetic vector about said plurality of cylindrical members; and
    means connected to said end caps for providing current flow longitudinally through said plurality of cylindrical members thereby causing a radial force vector.

2. The electroacoustic transducer of claim 1, wherein said means for providing current flow through said cylindrical members comprises an impulse source.

3. The electroacoustic transducer of claim 2, wherein said radial force vector is substantially at right angles to said circumferential magnetic vector said longitudinal current flow.

4. An electroacoustic transducer for emitting into and receiving from a surrounding medium acoustic waves, comprising:
    a plurality of cylindrical body members of magnetostrictive material coaxially arranged one inside the other;
    said body members bound to and electrically insulated from one another along the bound surfaces thereof;
    means for establishing fixed circumferential magnetic vectors about said body members said means comprising a toroidal coil wound about said body members; and a d.c. source coupled to said toroidal coil; and
    means coupled to the axial ends of said body members for establishing longitudinal current vectors through said body members thereby causing force vectors at substantially right angles to said magnetic vectors and said current vectors.

5. The electroacoustic transducer of claim 4 wherein said means for establishing said current vectors comprises an impulse source.

6. The electroacoustic transducer of claim 5 wherein said source comprises a pulsed current source.

7. Apparatus for acoustic well logging, comprising:

at least one electroacoustic transducer for transmitting acoustic energy;

said transmitting transducer having a plurality of cylindrical body members coaxially arranged, said cylindrical body members bonded together and electrical insulated from one another along the cylinder surfaces thereof;

said transmitting transducer having a toroidal winding thereabout and means for passing d.c. current through said winding for establishing circumferential magnetic vectors thereabout;

said transmitting transducer having means connected to the axial ends of said body members for passing longitudinal impulse current flow through said body members thereby causing a radially emitted energy; and at least one electroacoustic transducer disposed longitudinally from said at least one transmitting transducer for receiving said transmitted acoustic energy;

said receiving transducer having a plurality of cylindrical body members coaxially arranged, said cylindrical body members bonded together and electrically insulated from one another along the cylinder surface thereof;

said receiving transducer having a toroidal winding thereabout and means for passing d.c. current through said winding for establishing circumferential magnetic vectors thereabout;

said receiving transducer having means connected to the axial ends of said body members for detecting longitudinal impulse current flow through said body members caused by radially impinging energy.

* * * * *